United States Patent [19]
Haydu et al.

[11] Patent Number: 4,768,134
[45] Date of Patent: Aug. 30, 1988

[54] ACTUATOR MECHANISM FOR A CONCEALABLE HEADLAMP ASSSEMBLY

[75] Inventors: Bartley A. Haydu; Steven F. Tregilgas; William E. Carrell, all of Anderson, Ind.

[73] Assignee: General Motors Corporation, Detroit, Mich.

[21] Appl. No.: 91,090

[22] Filed: Aug. 31, 1987

[51] Int. Cl.⁴ ............................................. B60Q 1/06
[52] U.S. Cl. ....................................... 362/65; 362/66; 362/285; 74/89
[58] Field of Search ........................ 362/64, 65, 66, 70, 362/287; 74/89, 67, 70

[56] References Cited

U.S. PATENT DOCUMENTS

| | | | |
|---|---|---|---|
| 2,360,461 | 10/1944 | Ackerman | 362/64 |
| 2,360,469 | 10/1944 | Breer et al. | 362/64 |
| 2,842,401 | 7/1958 | Sjogren | 74/67 X |
| 3,578,772 | 9/1973 | Eyb | 362/65 |
| 3,796,104 | 3/1974 | Templeton | 74/70 X |
| 4,074,574 | 2/1978 | Schubert et al. | 74/89 X |
| 4,210,030 | 7/1980 | Andresen | 74/89 X |
| 4,246,628 | 1/1981 | Ikemizu et al. | 362/65 |
| 4,380,789 | 4/1983 | Craig | 362/65 |

Primary Examiner—Ira A. Lazarus
Assistant Examiner—Richard R. Cole
Attorney, Agent, or Firm—Edward J. Biskup

[57] ABSTRACT

An actuator mechanism for a pivoted member which includes a drive crank pivotally connected to a link which, in turn, is pivotally connected to a driven crank for transmitting drive to the driven link and wherein the link cooperates with a stationary pin for ensuring that the link is properly located for continuously providing drive to the driven crank in the proper direction even when the drive crank, link and driven crank are in longitudinal alignment.

6 Claims, 2 Drawing Sheets

ACTUATOR MECHANISM FOR A CONCEALABLE HEADLAMP ASSSEMBLY

This invention concerns actuator mechanisms in general and more particularly relates to an actuator mechanism for moving a headlamp assembly between a concealed position and an exposed position.

More specifically, the actuator mechanism made according to the present invention is mounted within an opening formed in a vehicle body at the forward end thereof and to one side of the longitudinal axis of the vehicle body. A headlamp assembly including a housing supporting a lamp unit is located in the opening and is connected to the vehicle body for rotation about a pivot shaft between a concealed position wherein the lamp unit is located within the vehicle body and an exposed position wherein the lamp unit can project a beam of light for the other vehicle body. The actuator mechanism is operatively connected to the housing for moving the lamp unit between the concealed and exposed positions and includes an electric motor having an output shaft which has a drive crank rigidly mounted thereon. A driven crank is rigidly mounted to the pivot shaft of the housing and a link is provided which serves to interconnect the drive crank to the driven crank. In the preferred form, a pin is fixed to the vehicle body adjacent the link and the latter is formed with a positioner aperture for receiving the pin. The arrangement of the pin and link is such that, during the rotation of the drive crank, the pin and link cooperate as the lamp unit moves between the concealed and exposed positions to ensure that movement of the headlamp assembly stops when it attains the latter mentioned positions and also that the link is properly positioned for transmitting drive from the drive crank to the driven crank in the proper direction of movement of the lamp unit when the drive crank and the driven crank are in longitudinal alignment.

The objects of the present invention are to provide a new and improved actuator mechanism for a concealable headlamp which includes a link formed with a positioner aperture that cooperates with a pin fixed to the vehicle for providing limit stop positions when the headlamp is fully exposed and when the headlamp is fully concealed; to provide a new and improved actuator mechanism for a concealable headlamp which includes a drive crank pivotally connected to a link, which, in turn is pivotally connected to a driven crank for transmitting drive from the drive crank to the driven crank and wherein the link cooperates with a pin fixed to the vehicle for ensuring that the link is properly located for providing drive to the driven crank in the proper direction even when the driven crank and the driven crank are in longitudinal alignment; and to provide a new and improved actuator mechanism for a pivoted member that includes a linkage for providing movement of the member between a first position and a second position and has a single link interconnecting a drive crank to a driven crank that is formed with positioner means aperture which cooperates with a fixed pin for stopping the movement of the member when it attains the first position or the second position and for ensuring that the driven crank is always rotating in the proper direction when the drive and driven cranks are in longitudinal alignment.

Other objects and advantages of the present invention will be apparent from a reading of the following detailed description when taken in conjunction with the accompanying drawings wherein FIG. 1 is a top plan view showing a headlamp assembly located in the fully exposed position within a vehicle opening and combined with an actuator mechanism according to the present invention;

Figure 1:
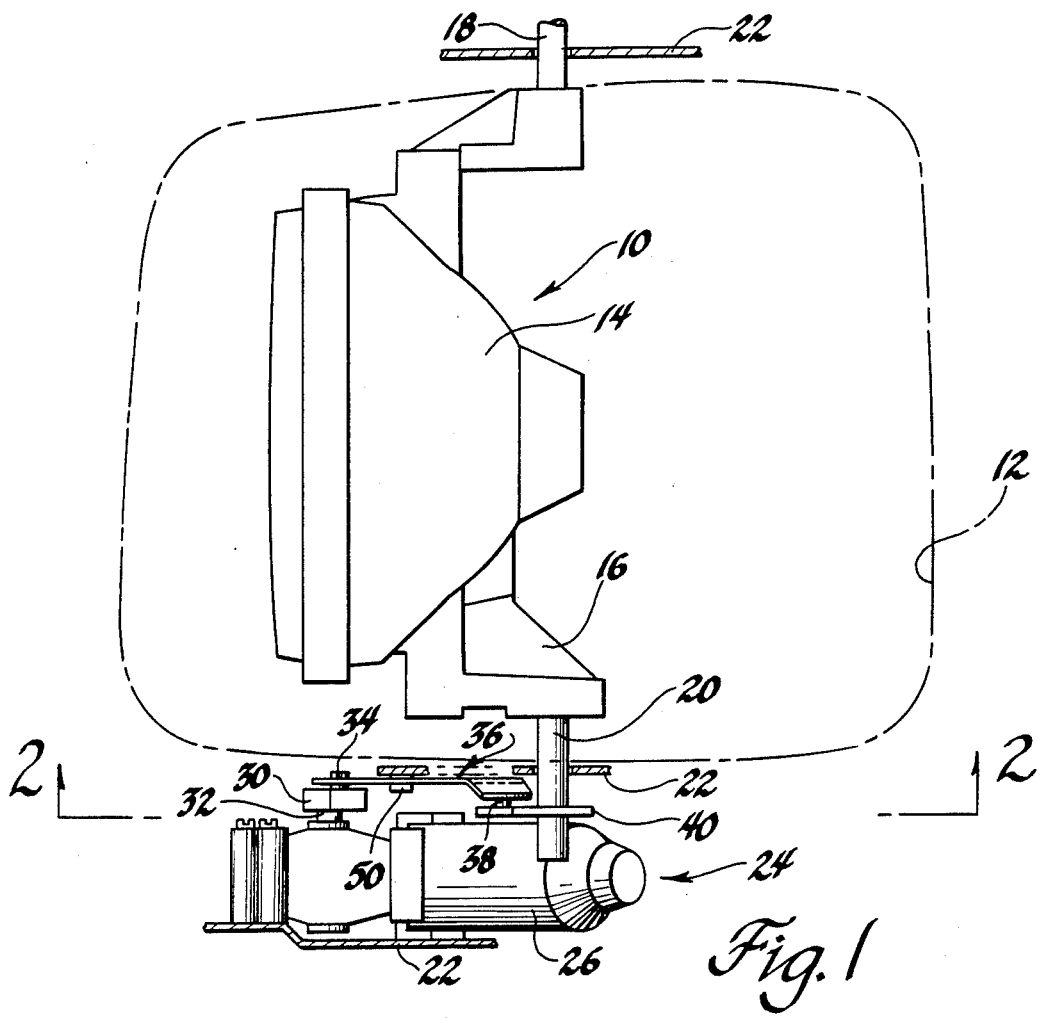
Figure 2:
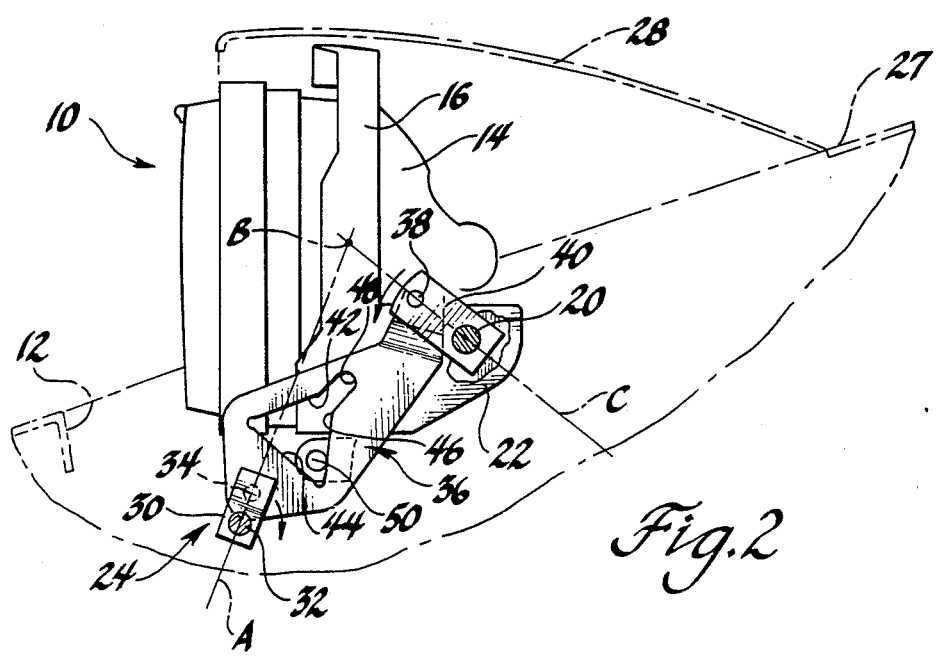
FIG. 2 is an elevation view of the headlamp assembly and the actuator mechanism taken on line 2—2 of FIG. 1.

Referring now to the drawings and more particularly to FIGS. 1 and 2 thereof, a headlamp assembly 10 is shown located within a rectangular opening 12 formed at the front end of a vehicle. The headlamp 10 is shown in the fully exposed position and includes a lamp unit 14 supported by a housing 16 which is rigid with a pair of oppositely extending and axially aligned trunnions 18 and 20. The trunnions 18 and 20 are supported for rotation about a horizontal axis by the sheet metal of the vehicle which is identified in each instance by the reference numeral 22. Adjacent the opening 12, an actuator mechanism 24, made according to the present invention, is provided which includes a reversible electric motor 26 supported in a fixed position by the sheet metal 22 of the vehicle. The electric motor 26 is drivingly connected through a linkage to the trunnion 20 fixed with the housing 16 and, as will hereinafter be explained, serves to move the headlamp assembly 10 between the fully exposed position of FIGS. 1 and 2 and the fully concealed position of FIG. 4.

As seen in FIGS. 1 and 2, when the headlamp assembly 10 is in the fully exposed position, the lamp unit 14 serves to project a light beam forwardly of the vehicle. On the other hand, when the headlamp assembly 10 is in the fully concealed position of FIG. 4, the lamp unit 14 is located below the upper body line 27 and the opening 12 is closed by a cover 28 which is attached to and forms a part of the housing 16.

As seen in FIG. 2, the actuator mechanism 24 also includes a drive crank 30 which is fixed at one end to the rotatable output shaft 32 of the electric motor 26. The other end of the drive crank 30 is connected by a pivotal connection 34 to one end of a link 36, the other end of which is connected by a pivotal connection 38 to one end of a driven crank 40. The other end of the driven crank 40 is rigidly connected to the trunnion 20 for rotation therewith. The link 36 is formed with an aperture which is triangular in configuration and defined by three walls 42, 44, and 46. At the point of intersection of an imaginary line through the walls 42 and 46, a U-shaped slot 48 is formed as a part of the aperture and serves a purpose to be explained hereinafter. In addition, a pin 50 fixed to the sheet metal 22 of the vehicle projects into the triangular aperture and cooperates with the walls 42-46 and the slot 48 for controlling movement of the link 36 and providing a limit stop for stopping movement of the headlamp assembly 10 when it reaches the fully exposed position of FIGS. 1 and 2 or the fully concealed position of FIG. 4.

In this regard and as seen in FIG. 2, when the headlamp assembly 10 is in the fully exposed position, the linkage of the actuator mechanism 24 is positioned as shown in FIG. 2 with the axis A, passing through the center of the output shaft 32 and the center of the pivotal connection 34, intersecting at a point B an axis C which passes through the center of the pivotal connection 38 and the center of the trunnion 20. At the same time, the wall 46 cooperates with the pin 50 to serve as a limit stop which prevents counterclockwise movement of the drive crank 30 so that the headlamp assembly 10 maintains the exposed position as shown.

Figure 3:
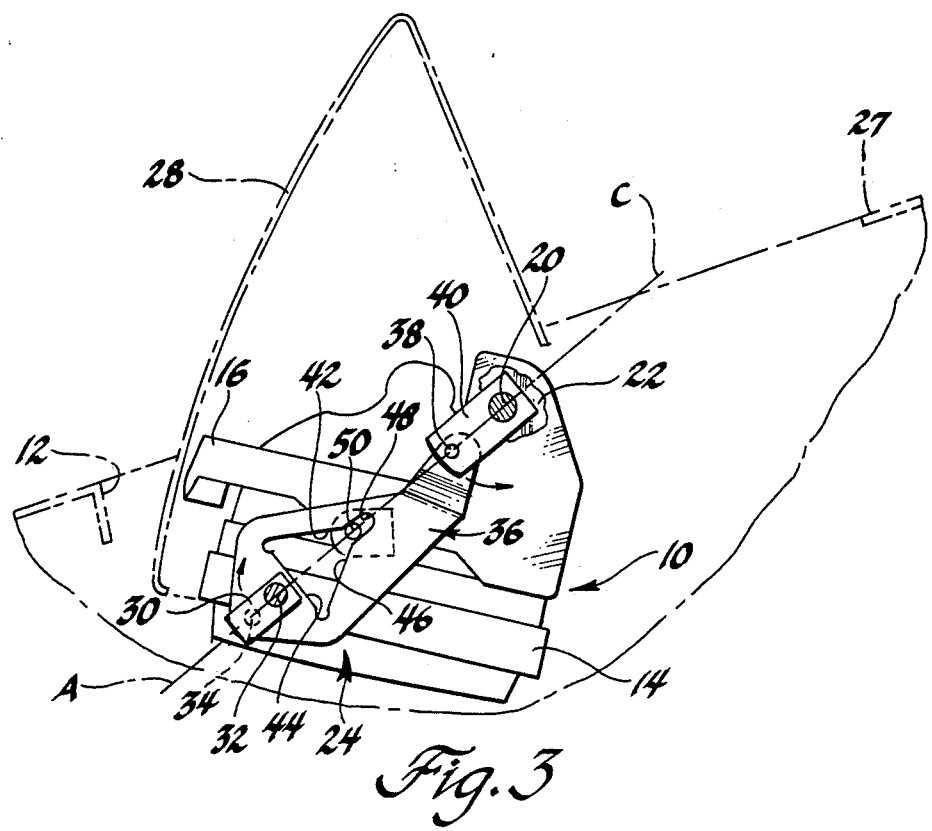
FIG. 3 is a view similar to FIG. 2 but shows the headlamp assembly and the linkage of the actuator mechanism in one of the positions assumed during the movement of the headlamp assembly from the fully exposed position to the fully concealed position.
Figure 4:
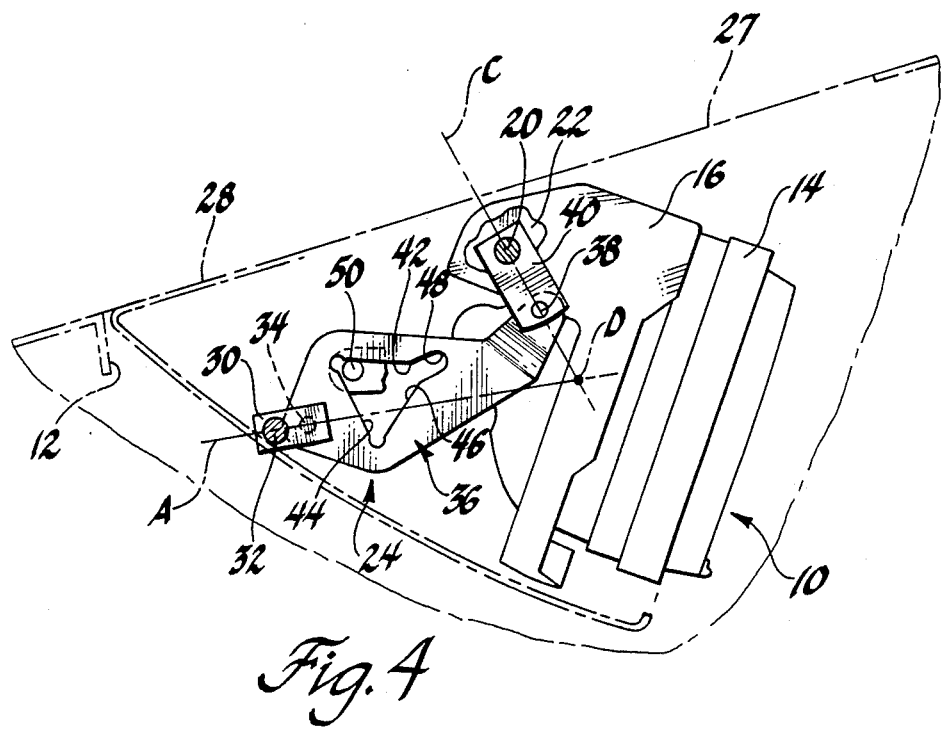
FIG. 4 is a view similar to FIG. 3 but shows the positions of the headlamp assembly and the linkage of the actuator mechanism when the headlamp unit is in the fully concealed position.

When it is desired to move the headlamp assembly 10 to the fully concealed position of FIG. 4, the electric motor 26 is energized so as to cause the drive shaft 32 to rotate in a clockwise direction as shown by the arrow in FIG. 2. As the drive crank 32 rotates in a clockwise direction, the line 36 under the control of the pin 50 moves downwardly and towards the output shaft 32 of the motor 26. This causes the driven crank 40 to rotate in a counterclockwise direction with corresponding rotation of the headlamp assembly 10. When the drive crank 32 reaches the position shown in FIG. 3, the headlamp assembly 10 will be partially concealed and the axes A and C will be aligned as shown and pass through of the pin 50 which is now located in the slot 48 of the triangular aperture. As a result, continued rotation of the drive crank 30 in the clockwise direction causes the pin 50 to act as a pivot about which the link 36 rotates in a clockwise direction to position the pivotal connection 38 "over center" and continue the counterclockwise rotation of the headlamp assembly 10 until it reaches the fully concealed position shown in FIG. 4 where the axes A and C intersect at a point D. Again, in this point, the pin 50 acts as a limit stop to prevent further rotation of the drive crank 30 by having the wall 42 contact the pin 50. As should be apparent, through a suitable limit switch or torque sensor, when the drive crank 30 reaches the position of FIG. 4, the motor 26 is automatically deenergized and conditioned for counterclockwise rotation of the output shaft 32 when the motor 26 is reenergized.

Afterwards, when the vehicle operator wishes to move the headlamp assembly 10 from the fully concealed position of FIG. 4 to the exposed position of FIG. 2, the electric motor 26 is again energized. As seen in FIG. 4, the output shaft 32 will then rotate in a counterclockwise direction causing the portion of line 36 adjacent to pivotal connection 34 to move upwardly and to the left resulting in the driven crank 40 being rotated in a clockwise direction. When the linkage reaches the position of FIG. 3 with the headlamp assembly 10 partially exposed, the A and C axes will again be aligned, but in this instance because the drive crank 30 is rotating in a counterclockwise direction, the link 36 pivots about the pin 50 in a counterclockwise direction to realize the "over center" movement so that the driven crank 40 can continue its movement in the clockwise direction for positioning the headlamp assembly 10 in the fully exposed position of FIG. 2. When the FIG. 2 position is attained, the pin 50 acts as a stop afore explained causing the motor 26 to be deenergized and again conditioned for reverse direction operation.

Various changes and modifications can be made in the construction of this actuator mechanism without departing from the spirit of the invention. For example, although this actuator mechanism is shown incorporated with a headlamp assembly, it could be used in a vehicle steering arrangement for providing movement of the vehicle wheels. In other words, the actuator mechanism is not limited in use with a headlamp assembly only, but can be usable with any type of member which requires movement between two positions. Accordingly, such changes and modifications are contemplated by the inventors and they do not wish to be limited except by the scope of the appended claims.

The embodiments of the invention in which an exclusive property or privilege is claimed are defined as follows:

1. An actuator mechanism for rotating a member from a first position to a second position, said actuator mechanism comprising drive means having a rotatable output shaft, a drive crank rigidly mounted on said output shaft for rotation therewith, a driven crank rigidly mounted on said member, a link pivotally interconnecting said drive crank to said driven crank, a pin fixed in position adjacent said link, and a positioner means formed in said link for engaging said pin, said pin and positioner means cooperating at one point during the movement of said member between said first position and said second position to ensure that said link is properly positioned for transmitting a drive force from said driver crank to said driven crank for driving said driven crank in the proper direction of rotation.

2. An actuator mechanism for rotating a member located on a vehicle from a first position to a second position, said actuator mechanism comprising a power source having a rotatable output shaft, a drive crank rigidly mounted on said output shaft for rotation therewith, a driven crank rigidly mounted on said member, a link pivotally interconnecting said drive crank to said driven crank, a stationary pin mounted to said vehicle, and positioner aperture formed in said link for receiving said pin, said pin and positioner aperture cooperating at one point during the movement of said member between said first position and said second position to ensure that said link is properly positioned for transmitting a drive force from said driver crank to said driven crank for driving said driven crank in the proper direction of rotation and also to ensure that said member stops when said member is in said first position and said second position.

3. An actuator mechanism for rotating a member pivotally supported on a vehicle from a first position to a second position, said actuator mechanism comprising a motor having an output shaft, a drive crank rigidly mounted on said output shaft for rotation therewith, a driven crank rigidly mounted on said member, a link pivotally interconnecting said drive crank to said driven crank, a stationary pin mounted to said vehicle, and a triangular positioner aperture formed in said link for receiving said pin, said pin and positioner aperture cooperating when said drive crank and said driven crank are in longitudinal alignment during the movement of said member between said first position and said second position to ensure that said link is properly positioned for transmitting a drive force from said driver crank to said driven crank for driving said driven crank in the proper direction of rotation and also to ensure that said member stops in position when said member reaches said first position and said second position.

4. In combination with a vehicle having a body opening formed in the forward end of the vehicle, a headlamp assembly including a housing located in said opening and having a headlamp mounted therein, trunnion means fixed with said housing for connecting said housing to said body for rotation about a horizontal axis between a first position wherein said housing conceals the associated opening and a second position wherein said headlamp in said housing is exposed to project a beam of light forwardly of said vehicle body, an actuator mechanism rotating said headlamp assembly from said first position to said second position, said actuator mechanism comprising an electric motor having an output shaft, a drive crank rigidly mounted on said output shaft for rotation therewith, a driven crank rigidly mounted on said trunnion means of said housing, a link pivotally interconnecting said drive crank to said driven crank, a pin fixed to said vehicle, and positioner means formed in said link for engaging said pin, said pin and positioner means cooperating at one point during the movement of said headlamp between said first position and said second position to ensure that said link is properly positioned for transmitting a drive force from said driver crank to said driven crank for driving said driven crank in the proper direction of rotation.

5. In combination with a vehicle having a body opening formed in the forward end of the vehicle, a headlamp assembly including a housing located in said opening and having a headlamp mounted therein, trunnion means fixed with said housing for connecting said housing to said body for rotation about a horizontal axis between a first position wherein said housing conceals the associated opening and a second position wherein said headlamp in said housing is exposed to project a beam of light forwardly of said body, an actuator mechanism rotating said headlamp assembly from said first position to said second position, said actuator mechanism comprising an electric motor having an output shaft, a drive crank rigidly mounted on said output shaft for rotation therewith, a driven crank rigidly mounted on said trunnion means of said housing, a link pivotally interconnecting said drive crank to said driven crank, a stationary pin mounted to said vehicle, and positioner means formed in said link for receiving said pin, said pin and positioner means cooperating at one point during the movement of said headlamp between said first position and said second position to ensure that said link is properly positioned for transmitting a drive force from said driver crank to said driven crank for driving said driven crank in the proper direction of rotation and also to ensure that said headlamp assembly stops when said headlamp is in said first position and said second position.

6. In combination with a vehicle having a body opening formed in the forward end of the vehicle, a headlamp assembly including a housing located in said opening and having a headlamp mounted therein, trunnion means fixed with said housing for connecting said housing to said body for rotation about a horizontal axis between a first position wherein said housing conceals the associated opening and a second position wherein said headlamp in said housing is exposed to project a beam of light forwardly of said body, an actuator mechanism rotating said headlamp assembly from said first position to said second position, said actuator mechanism comprising an electric motor having an output shaft, a drive crank rigidly mounted on said output shaft for rotation therewith, a driven crank rigidly mounted on said trunnion means of said housing, a link pivotally interconnecting said drive crank to said driven crank, a stationary pin mounted to said vehicle, and a triangular positioner aperture formed in said link for receiving said pin, said pin and positioner aperture cooperating when said drive crank and said driven crank are in longitudinal alignment during the movement of said headlamp between said first position and said second position to ensure that said link is properly positioned for transmitting a drive force from said driver crank to said driven crank for driving said driven crank in the proper direction of rotation and also to ensure that said headlamp assembly stops in position when said headlamp reaches said first position and said second position.

* * * * *